Feb. 24, 1959     H. D. CRANDON     2,875,087
METHOD OF FORMING REFLECTIVE SURFACES
Filed Feb. 23, 1954

INVENTOR
HARRY D. CRANDON
BY
ATTORNEY

United States Patent Office 2,875,087
Patented Feb. 24, 1959

2,875,087
METHOD OF FORMING REFLECTIVE SURFACES

Harry D. Crandon, Woodstock, Conn., assignor to American Optical Company, Southbridge, Mass., a voluntary association of Massachusetts Application February 23, 1954, Serial No. 411,852

6 Claims. (Cl. 117—10)

This invention relates to improvements in sheet material having a reflective surface thereon such as used in forming picture projection screens and has particular reference to the provision of novel means and method of increasing the reflectivity of such surfaces.

One of the principal objects of the invention is to provide sheeting of the above character having high reflectivity, durability, and non-inflammability and novel means and method of making the same.

Another object is to provide a picture projection screen having a vinyl base suitable for embossing and having thereon a metallized surface of high reflectivity and novel means and method of making the same.

Another object is to provide a novel method of forming an embossed highly reflective picture projection screen comprising forming on a woven fabric a coating or coatings of vinyl resin of a thickness suitable to accommodate for embossing, forming a highly reflective surface of oriented metal flakes on said vinyl resin and embossing said reflective surface in such manner as to retain the oriented relation of said flakes.

Other objects and advantages of the invention will become apparent from the following description taken in connection with the accompanying drawings, in which, Fig. 1 is a fragmentary face view of the sheeting embodying the invention which is illustrated as formed into a picture projection screen;

Figure 1:
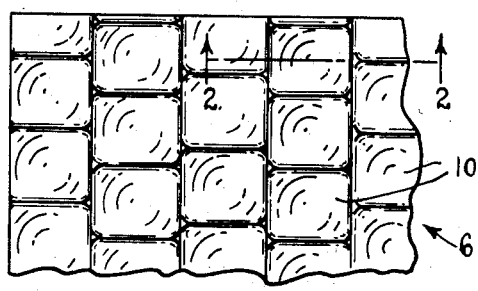
Figure 2:
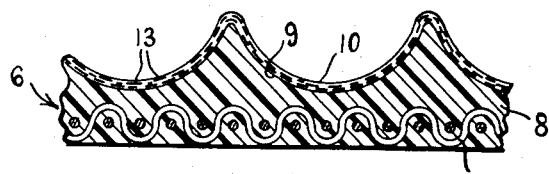
Fig. 2 is an enlarged sectional view taken as on line 2—2 of Fig. 1 and looking in the direction indicated by the arrows, showing the ultimate section of the screen after the embossing has been completed.

Referring more particularly to the drawings wherein like characters of reference designate like parts throughout the several views, the screen 6, as shown in Figs. 1 and 2, comprises a sheetlike base 7 of finely woven fabric, such as airplane cloth or the like. On the base 7 there is a coating or coatings 8 of plastic material, such as vinyl resin, having on the outer surface thereof a plurality of contiguously related spherically-shaped depressions 9 which may be formed by an embossing die such as shown and described in George A. Granitsas application for Patent Serial No. 364,429, filed June 26, 1953 and issued May 28, 1957, as Patent No. 2,793,585. The said depressions 9 are provided wtih an outer specularly reflecting surface 10.

The vinyl resin 8 may be applied as a single coating or may be built up of a plurality of relatively thin layers to a resultant thickness dependent upon the depth to which the spherical depressions 9 are formed. In building up the coating 8 the first layer is formed by placing a mixture of vinyl chloride resin and a plasticizer such as tricresyl phosphate, #2-ethyl hexyl diphenyl phosphate, tri-octyl phosphate, or the like on the base 7, subjecting said layer to heat of a temperature within the range of from 360° to 380° F. and pressing the said layer into the meshes of the fabric by calendering or the like. A plurality of layers of from .001" to .004" in thickness is successively placed one on top of the other with each respective layer being separately subjected to heat within the above-mentioned temperature range.

It is pointed out that the mixture of vinyl chloride resin and the plasticizer is so controlled that the viscosity thereof is such as to permit it to flow properly in forming said plurality of layers and in accordance with the resultant physical characteristics desired of the final screen, that is, the extent of flexibility or stiffness desired of the screen. The stiffness of the screen increases with the higher percentage of resin and vice versa. The actual plasticizer used is selected according to the flame resistance required of the screen as some of said plasticizers are more heat resistant than others. In the present instance, the preferred plasticizer is tricresyl phosphate, as it is more resistant to flame than any other known plasticizer, and when combined with vinyl chloride resin which in itself is flame-resistant, forms a desirable noninflammable screen.

Figure 3:
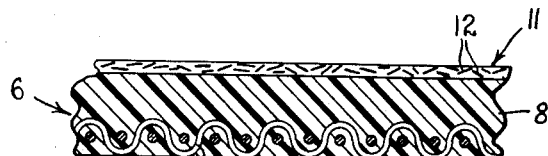
Fig. 3 is a view generally similar to Fig. 2 of a step in the process of fabrication.

As shown diagrammatically in Fig. 3, a vinyl resin film 11 containing aluminum flake is placed on the outer surface of the vinyl resin coating or coatings 8. This film comprises a plastisol or organosol containing the aluminum flake and is preferably formed by combining with 50% vinyl resin and 50% plasticizer approximately 10% of aluminum flakes. The aluminum flakes are of the standard commercial leafing type having a coating of material thereon which gives them a tendency to float on a liquid surface. For example, the flakes might be coated with stearic acid or other similarly functioning materials as known in the art. The coating serves to increase the tendency of the flakes to orient on the liquid surface. The carrier in this instance is the plastisol or organosol. Aluminum flakes having a mesh of from 100 to 400 per inch may be used. It, however, is preferable to use flakes of approximately 325 mesh.

Although it has been stated that it is preferable to use 10% aluminum, it is to be understood that this percentage may be varied from 7% to 20%. However, if more than 10% is used it is necessary to add a liquid diluent such as an aliphatic hydrocarbon that will completely evaporate under 350° F. and within a relatively short interval of time. This temperature and time interval must be below the temperature and time interval required in the fusing utilized in forming the various layers of the coating 8, as specified above, which fusing temperature is between 360° and 380° F. When aliphatic hydrocarbons are referred to, it is intended to mean a diluent such as textile spirits, V. M. & P. naphtha, mixtures of xylene and toluene, Solvesso No. 2 or other known similar diluents.

The top layer embodying the aluminum powder is formed to a thickness varying from .001" to .004" and is formed by uniformly spreading the mixture on the outer surface of the vinyl coating 8, as shown at 11 in Fig. 3. It is pointed out that the flakes, as diagrammatically illustrated by the lines 12 in the layer 11, are in random relation with each other and tend to assume this relation when the layer 11 is spread on the outer surface of the vinyl layer 8 as stated above. This is because of the viscous nature of the vinyl plastisol. If the flakes are allowed to remain in this random relation maximum reflectivity cannot be obtained.

Figure 4:
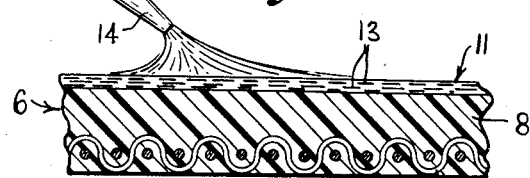
Fig. 4 is a view generally similar to Fig. 3 of a further step in the process of fabrication.

Therefore, while the layer 11 is in a fluid state and to cause the flakes to float and become oriented with respect to each other, as shown diagrammatically by the lines 13 in Fig. 4, the layer 11 is provided with a liquid film which may be sprayed or condensed thereon by a spray nozzle or similar means diagrammatically illustrated at 14 in Fig. 4. The liquid film may be water, water-alcohol mixtures, water-dioxane mixtures, dioxane, 2-nitropropane, zylene, toluene, textile spirits. Solvesso No. 2, butyl acetate, trichloroethylene or any liquid of a similar nature. This liquid spray functions cooperatively with the stearic acid on the aluminum flakes to cause the flakes to float and become oriented with each other. Condensation of steam has been found preferable because of its cheapness and east of application.

After the aluminum flakes have become oriented, as diagrammatically illustrated in Fig. 4, the coated sheeting is subjected to heat of a temperature of approximately 375° F. to cause the said coating to set and retain the flakes in said oriented relation. This causes the outer aluminum layer to have maximum reflectivity.

In instances when diluents are used, such as in organosol, such diluents have to be evaporated before the aluminum flakes are oriented to insure that they do not become trapped beneath said flakes and cause subsequent bubbles or other imperfections to be formed. This is accomplished by subjecting the coated sheets to a temperature under 350° F. or below the temperature required for setting the vinyl resin as stated above. Subsequent to said evaporation, and to permit the flakes to become oriented, the layer 12 is subjected to spraying or condensation to form the liquid film thereon to float the aluminum flakes as previously described.

After the flakes have been oriented, the composite structure is subjected to heat of a temperature of approximately 375° F. and for a time interval sufficient to fuse and set the vinyl and retain the flakes in oriented relation with each other.

When it is desired to emboss the resultant sheet material, it is first subjected to heat ranging from 250° to 380° F. When in said heated state the material is then run through an embossing roll having its surface so controlled as to form the closely related spherically-shaped recesses in the plastic. In this instance, the embossing roll is preferably retained at a low temperature. If desired, however, the embossing may be performed by heating the roll to the high temperature while retaining the sheet material at room temperature and running said sheet through said heated roll and then chilling the sheet material to cause it to set and retain said embossing. However, it is preferably to use the first described method, as the relatively cold embossing roll, during the embossing operation, has a tendency to chill the aluminum surface and thereby cause the undercoating of vinyl material 8 to become superficially chilled while the remainder of the vinyl material flows upwardly and in a sidewise direction to form a solid intimate backing for the embossed aluminum layer. It is pointed out that the oriented flakes of aluminum retain their oriented relation with each other during said embossing and thereby retain their maximum reflectivity. This is shown diagrammatically by the solid lines 13 in the reflecting surface 10 of Fig. 2.

If it is desired to provide protective means for the outer aluminum coating, it may be coated with a relatively thin protective film of vinyl resin of a thickness of approximately .001" or less.

In order to afford consistency in obtaining the best possible results during the embossing operation, such, for example, as uniformity of thickness of the resultant layer of aluminum, sharp lines of demarkation between the embossed areas and proper backing support for said areas, the flow characteristics of the resins of the aluminized layer 10 and backing coating 8, in response to heat and pressure, must be controlled. If the layer containing the aluminum flake is too soft and more readily flowable then the backing coating 8, difficulty will be encountered in retaining the above desired characteristics.

The flow characteristics of the aluminum-containing layer 11 should be approximately the same as the flow characteristics of the supporting layer 8 which can be accomplished by using the proper resin to plasticizer ratio in said layers.

Although it has been specified above that aluminum flakes are used in forming the reflective surfaces, it is to be understood that gold, bronze, silver, copper, nickel, chrome or any other high reflecting flake material might be used. It is to be understood, however, that these flakes would be provided with a coating of stearic acid or similar material as the aluminum flakes described herein.

Although the depressions 9 have been defined as being spherical, it is to be understood that they may be formed ellipsoidal, trochoidal or any other desirable shape by proper control of the embossing die.

From the foregoing, it will be seen that simple, efficient and economical means and methods have been provided for accomplishing the invention in accordance with the objects set forth hereinbefore. It will be apparent, however, that many changes may be made in said means and method shown and described without departing from the spirit of the invention as expressed in the accompanying claims. Therefore, it is to be understood that all matter set forth in the specification or shown in the accompanying drawing is to be interpreted as illustrative and not in a limiting sense.

Having described my invention, I claim:

1. A method of forming a high reflecting surface on sheetlike vinyl resin comprising placing a vinyl resin film containing reflective metallic flakes coated with stearic acid on the outer surface of said vinyl sheeting, wetting said vinyl resin film to cause said flakes to float and become oriented with each other and thereafter heating said vinyl resin film to set and retain said flakes in said oriented relation.

2. A method of forming a high reflecting surface on sheetlike vinyl resin comprising placing a vinyl resin film containing reflective metallic flakes coated with stearic acid on the outer surface of said vinyl sheeting, subjecting said vinyl resin film to a jet of steam to wet said resin and cause said flakes to float and become oriented with each other and thereafter heating said vinyl resin to set and retain said flakes in said oriented relation.

3. A method of forming a picture projection screen with a high reflecting surface comprising placing a vinyl resin film containing reflective metallic flakes coated with stearic acid on a sheetlike base of vinyl resin of a controlled thickness, wetting said vinyl resin film to cause said flakes to float and become oriented with each other, heating said vinyl resin film to cause it to set and retain said flakes in said oriented relation and embossing said reflective surface to form closely related depressions of controlled surface shape therein while substantially retaining the oriented relation of the metallic flakes in said depressions.

4. A method of forming a picture projection screen with a high reflecting surface comprising placing a vinyl resin film containing reflective metallic flakes coated with stearic acid on a sheetlike base of vinyl resin of a controlled thickness, wetting said vinyl resin film by subjecting said film to steam to cause said flakes to float and become oriented with each other, heating said vinyl resin film to cause it to set and retain said flakes in said oriented relation and embossing said reflective surface to form closely related spherical depressions therein while substantially retaining the oriented relation of the metallic flakes in said depressions.

5. A method of forming a picture projection screen with a high reflecting surface on sheetlike vinyl resin comprising placing a vinyl resin film containing reflective metallic flakes coated with stearic acid on a sheetlike base of vinyl resin of a controlled thickness, subjecting said vinyl resin film to a jet of steam to wet said resin and cause said flakes to float and become oriented with each other and thereafter heating said vinyl resin to set and retain said flakes in said oriented relation and embossing said reflective surface to form closely related depressions of controlled surface shape therein while substantially retaining the oriented relation of the metallic flakes in said depressions.

6. A method of forming a picture projection screen with a high reflecting surface comprising placing a vinyl resin film containing reflective aluminum flakes coated with stearic acid on a sheetlike base of vinyl resin of a controlled thickness, wetting said vinyl resin film to cause said flakes to float and become oriented with each other, heating said vinyl resin film to cause it to set and retain said flakes in said oriented relation and embossing said reflective surface to form closely related depressions of controlled surface shape therein while substantially retaining the oriented relation of the aluminum flakes in said depressions.

References Cited in the file of this patent

UNITED STATES PATENTS

| Number | Name | Date |
|---|---|---|
| 1,351,181 | McKay | Aug. 31, 1920 |
| 1,557,530 | Martin | Oct. 13, 1925 |
| 1,676,553 | Hewitt | July 10, 1928 |
| 1,720,232 | North | July 9, 1929 |
| 1,747,425 | Cawley | Feb. 18, 1930 |
| 1,934,802 | Hitchcock | Nov. 14, 1933 |
| 1,941,398 | Iliff | Dec. 26, 1933 |
| 1,955,888 | Nollau | Apr. 24, 1934 |
| 2,143,946 | Hunter | Jan. 17, 1939 |
| 2,201,981 | Baron | May 28, 1940 |
| 2,202,988 | Kennedy | June 4, 1940 |
| 2,390,758 | Wahlberg | Dec. 11, 1945 |
| 2,506,165 | Mountcastle | May 2, 1950 |
| 2,579,892 | Wright | Dec. 25, 1951 |
| 2,593,207 | Silver | Apr. 15, 1952 |